(12) United States Patent  (10) Patent No.: US 7,730,477 B2
Laird  (45) Date of Patent: Jun. 1, 2010

(54) SYSTEM AND METHOD FOR PROPAGATION IN A WEB PORTAL SYSTEM

(75) Inventor: Peter Laird, Superior, CO (US)

(73) Assignee: BEA Systems Inc., Redwood Shores, CA (US)

( * ) Notice: Subject to any disclaimer, the term of this patent is extended or adjusted under 35 U.S.C. 154(b) by 1194 days.

(21) Appl. No.: 11/235,773

(22) Filed: Sep. 26, 2005

(65) Prior Publication Data

US 2007/0073785 A1 Mar. 29, 2007

(51) Int. Cl.
*G06F 9/44* (2006.01)
(52) U.S. Cl. ........................ 717/170; 717/169
(58) Field of Classification Search .......... 717/168–170
See application file for complete search history.

(56) References Cited

U.S. PATENT DOCUMENTS

| | | | | |
|---|---|---|---|---|
| 5,732,275 | A * | 3/1998 | Kullick et al. | 717/170 |
| 6,031,993 | A * | 2/2000 | Andrews et al. | 717/143 |
| 6,052,531 | A * | 4/2000 | Waldin et al. | 717/170 |
| 6,389,592 | B1 * | 5/2002 | Ayres et al. | 717/172 |
| 6,449,624 | B1 | 9/2002 | Hammack et al. | |
| 6,502,098 | B2 * | 12/2002 | Lau | 707/100 |
| 6,651,249 | B2 * | 11/2003 | Waldin et al. | 717/170 |
| 6,681,391 | B1 * | 1/2004 | Marino et al. | 717/175 |
| 6,820,259 | B1 * | 11/2004 | Kawamata et al. | 717/173 |
| 7,013,459 | B2 * | 3/2006 | Kuch et al. | 717/158 |
| 7,020,875 | B2 * | 3/2006 | Zweifel et al. | 717/168 |
| 7,127,712 | B1 * | 10/2006 | Noble et al. | 717/173 |
| 7,140,013 | B2 * | 11/2006 | Te'eni et al. | 717/173 |
| 7,185,332 | B1 * | 2/2007 | Waldin et al. | 717/170 |
| 7,263,698 | B2 * | 8/2007 | Wildhagen et al. | 717/170 |
| 7,322,025 | B2 | 1/2008 | Reddy et al. | |
| 7,383,534 | B1 * | 6/2008 | Agbabian et al. | 717/120 |
| 7,386,839 | B1 * | 6/2008 | Golender et al. | 717/131 |
| 2003/0182414 | A1 * | 9/2003 | O'Neill | 709/223 |
| 2003/0221190 | A1 * | 11/2003 | Deshpande et al. | 717/171 |
| 2003/0226132 | A1 * | 12/2003 | Tondreau et al. | 717/116 |
| 2004/0015803 | A1 * | 1/2004 | Huang et al. | 716/10 |
| 2004/0015833 | A1 * | 1/2004 | Dellarocas et al. | 717/106 |
| 2004/0040021 | A1 * | 2/2004 | Bharati et al. | 717/170 |
| 2004/0170977 | A1 * | 9/2004 | Laird | 435/6 |
| 2004/0181790 | A1 * | 9/2004 | Herrick | 717/168 |
| 2004/0210653 | A1 * | 10/2004 | Kanoor et al. | 709/223 |
| 2004/0215755 | A1 * | 10/2004 | O'Neill | 709/223 |
| 2004/0250236 | A1 * | 12/2004 | O'Malley et al. | 717/104 |
| 2005/0039173 | A1 * | 2/2005 | Tondreau et al. | 717/136 |
| 2005/0114853 | A1 * | 5/2005 | Glider et al. | 717/170 |

(Continued)

*Primary Examiner*—Anna Deng
(74) *Attorney, Agent, or Firm*—Fliesler Meyer LLP

(57) ABSTRACT

In accordance with embodiments, there are provided mechanisms and methods for determining an ordering for propagating changes to an application between a first environment and a second environment. These mechanisms and methods can enable embodiments to propagate changes from a first application instance in a first environment to a second application instance in a second environment even when the order of applying the changes is complex or not readily apparent to the propagating device. For example, an embodiment can determine an ordering to apply changes made to a test version in a test environment, tested and then propagated to a production version of the application residing in a production environment. The ability of embodiments to determine an ordering for propagating changes to an application between a first environment and a second environment enable easy capture and transferal of changes to an application.

22 Claims, 8 Drawing Sheets

U.S. PATENT DOCUMENTS

| | | |
|---|---|---|
| 2005/0177617 A1 | 8/2005 | Banginwar et al. |
| 2006/0015839 A1* | 1/2006 | Owens et al. ............... 717/100 |
| 2006/0048130 A1* | 3/2006 | Napier et al. ............... 717/168 |
| 2006/0184926 A1* | 8/2006 | Or et al. ..................... 717/168 |
| 2007/0033580 A1* | 2/2007 | Ringseth et al. ............. 717/137 |
| 2008/0244534 A1* | 10/2008 | Golender et al. ............ 717/128 |
| 2009/0007094 A1* | 1/2009 | Hinton et al. ................ 717/175 |
| 2009/0125128 A1* | 5/2009 | Eldridge et al. ................ 700/86 |
| 2009/0138875 A1* | 5/2009 | Rothman et al. ............ 717/173 |

* cited by examiner

SYSTEM AND METHOD FOR PROPAGATION IN A WEB PORTAL SYSTEM

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/253,773 entitled SYSTEM AND METHOD FOR PROPAGATION IN A WEB PORTAL SYSTEM, by Peter Laird, filed on Sep. 26, 2005, and U.S. patent application Ser. No. 11/236,698 entitled SYSTEM AND METHOD FOR PROPAGATING SECURITY INFORMATION IN A WEB PORTAL SYSTEM, by Peter Laird et al., filed on Sep. 26, 2005.

FIELD OF THE INVENTION

The present invention relates generally to systems, methods, and computer readable media for managing portal applications. The present invention relates particularly to the propagation of portal data.

BACKGROUND OF THE INVENTION

Since its inception in 1995, the Java® programming language (Java® is a registered trademark of Sun Microsystems, Inc.) has become increasingly popular. Java, which is an interpreted language, enabled the creation of applications that could be run on a wide variety of platforms, i.e., so called "platform independent applications." This ability to function across a variety of different client platforms and Java's relatively easy implementation of network applications has resulted in its use in endeavors as basic as personal webpages to endeavors as complex as large business-to-business enterprise systems.

As Java has become more commonplace, a wide variety of tools and development platforms have been created to assist developers in the creation and implementation of platform independent applications using Java or other languages that support platform independent applications. One such type of platform independent application is the web portal. A web portal is a World Wide Web site whose purpose is to be a starting point for a wide variety of users when these users connect to the Web.

As with other types of applications, there is a need to perform backup and propagation of portal applications. Often a developer will wish to modify an application in a development and testing environment first before propagating the changes to a version of the application that is part of a working portal, i.e., the "working setting" or "production environment." After testing the modified application in the testing environment, the developer then passes the changes to the version of the application in the working setting.

However, migration of portal applications can be difficult. Portal applications may be difficult to configure and often store relevant data in a variety of difficult-to-identify locations. This makes the task of accurately propagating the changes to the version of the application in the working setting highly unreliable and time consuming.

What is needed is an improved mechanism for propagating portal applications that allows for the easier transferal of content associated with web portal systems.

DETAILED DESCRIPTION

Figure 1:
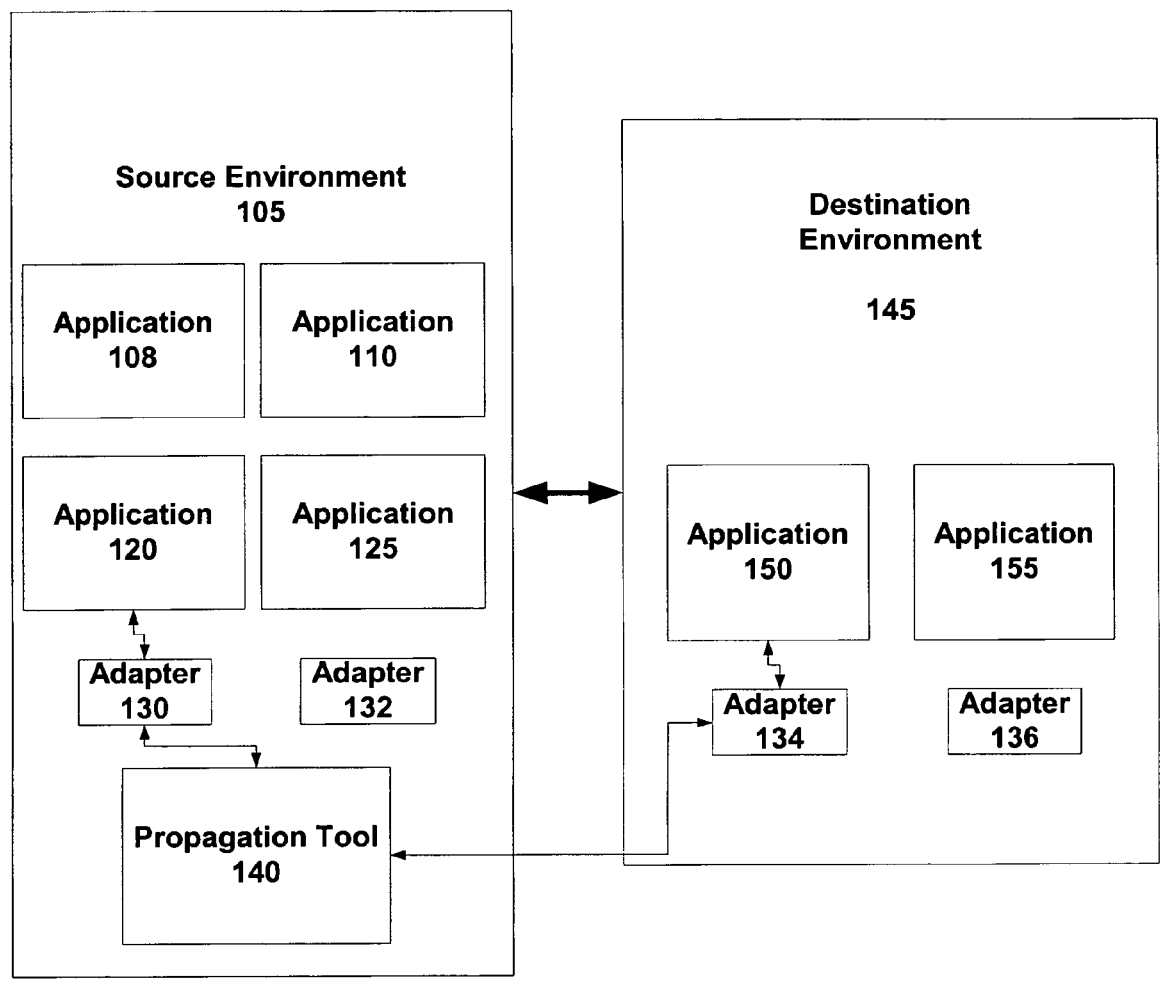
FIG. 1 illustrates a high-level overview of an interaction between a source environment and a destination environment in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for determining an ordering for propagating changes to an application between a first environment and a second environment. These mechanisms and methods can enable embodiments to propagate changes from a first application instance in a first environment to a second application instance in a second environment even when the order of applying the changes is complex or not readily apparent to the propagating device. For example, an embodiment can determine an ordering to apply changes made to a test version in a test environment, tested and then propagated to a production version of the application residing in a production environment. The ability of embodiments to determine an ordering for propagating changes to an application between a first environment and a second environment enable easy capture and transferal of changes to an application.

In an embodiment, a method for determining an ordering for propagating changes to an application between a first environment and a second environment is provided. The method includes receiving a set of changes to be made to the second version of the application residing in a second environment. The set of changes indicates changes made to the first version of the application that can be propagated to the second version of the application. A suggested ordering of the application of changes to be made to the second version is made when an instance of an unresolved ordering is detected while applying changes during propagation of the set of changes to the second version of the application. An "unresolved ordering" can occur any time there are more than one changes to be made to an application, and the order that the changes are made can affect the outcome. An inquiry for a suggested ordering may be made of an adapter associated with the destination (i.e., second environment) application. The changes are applied to the second version according to the suggested ordering, when a suggested ordering is received. In an embodiment, the suggested ordering returned by the adapter comprises a default ordering determined from traversing a configuration tree.

In another embodiment, the method for determining an ordering for propagating changes includes determining whether the suggested ordering for applying the changes was successful. If the suggested ordering is successful, then the processing is completed. Otherwise, a determination is made which changes were correctly applied. Then, an alternative suggested ordering is requested. The alternative suggested ordering may be requested from a destination adapter, an administrator, or other source(s). The changes may be applied according to the alternative suggested ordering. One method embodiment includes performing the foregoing described processing until a successful propagation of the changes is achieved.

As used herein, the term application is intended to be broadly construed to include any data entry, update, query or program that processes data on behalf of a user, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications. Users may be human or computational entities. As used herein, the term environment is intended to be broadly construed to include a set of any characteristics of a computer configuration, including hardware and software characteristics, such as without limitation, operating system, Central Processor Unit (CPU) model, data communications systems, database systems, programming languages and any applicable standards.

FIG. 1 illustrates a high-level overview of an interaction between a source environment 105 and a destination environment 145 in an embodiment. The source environment 105 and destination environment 145 are environments in which portal applications are deployed. In some embodiments, the source environment 105 is a testing and deployment environment in which applications are tested and evaluated and the destination environment 145 is an environment in which applications are deployed for their intended functions. Sometimes, source environment 105 may be referred to as a staging environment, because in some implementations, developers stage their new developments to the source environment 105.

In an example configuration illustrated by FIG. 1, the applications 108, 110, 120, 125 are portal applications stored in the source environment 105 that perform various services and functions in association with a central portal. As used herein, a central portal is the portal application being exposed to users, and/or the portal application that manages or directs the activities of other portals and/or portal applications. One or more adapters 130, 132 provide interfaces and specific functionality to tools and other applications that operate in conjunction with for applications 108, 110, 120, 125. Each one of adapters 130, 132 is responsible for import/export of a certain kind of data (content, security, portal) in a common language format, which in one embodiment, is eXtended Markup Language (XML) format. The adapters 130, 132 relate native data structures within the applications 108, 110, 120, 125 to XML. The produced XML can be propagated by a tool or other application. In an embodiment, one or more of adapters 130, 132 may comprise security information that the adapter produces as XML to be propagated by a tool or application. Such an adapter may be referred to as a "security adapter".

One such tool for propagating the information provided by the adapters 130, 132 is the propagation tool 140, which enables propagation of applications and changes to applications from the source environment 105 to the destination environment 145. In one embodiment, the propagation tool 140 copies an entire application from the source environment to the destination environment to generate one of the applications 150, 155 stored in the destination environment. In an alternate embodiment, the propagation tool 140, working in conjunction with adapters 130, 134 compares an application 120 in the source environment to a corresponding application 150 in the destination environment 145, determines the differences between the two applications, and modifies the application 150 in the destination environment to match the application in the source environment 105. If the propagation tool 140 detects any unresolved ordering while applying changes to application 150 propagated from application 120, the propagation tool 140 may inquire of adapter 134 for a suggested ordering of the application of changes to be made. Adapter 134 may provide a suggested ordering by comparing the differences between the two applications with a configuration stored an internally (in one embodiment) as a tree. In one embodiment, the propagation tool 140 may track which changes succeeded and which changes failed. In the event that some changes failed, the propagation tool can request that the adapter 134 provide a new suggested ordering, request a suggested ordering from an administrator or take other actions, such as applying one or more rules, heuristics or randomized selection mechanisms, to arrive at a new suggested ordering. The propagation tool 140 may retry the above processing any number of times until success is achieved.

Figure 2:
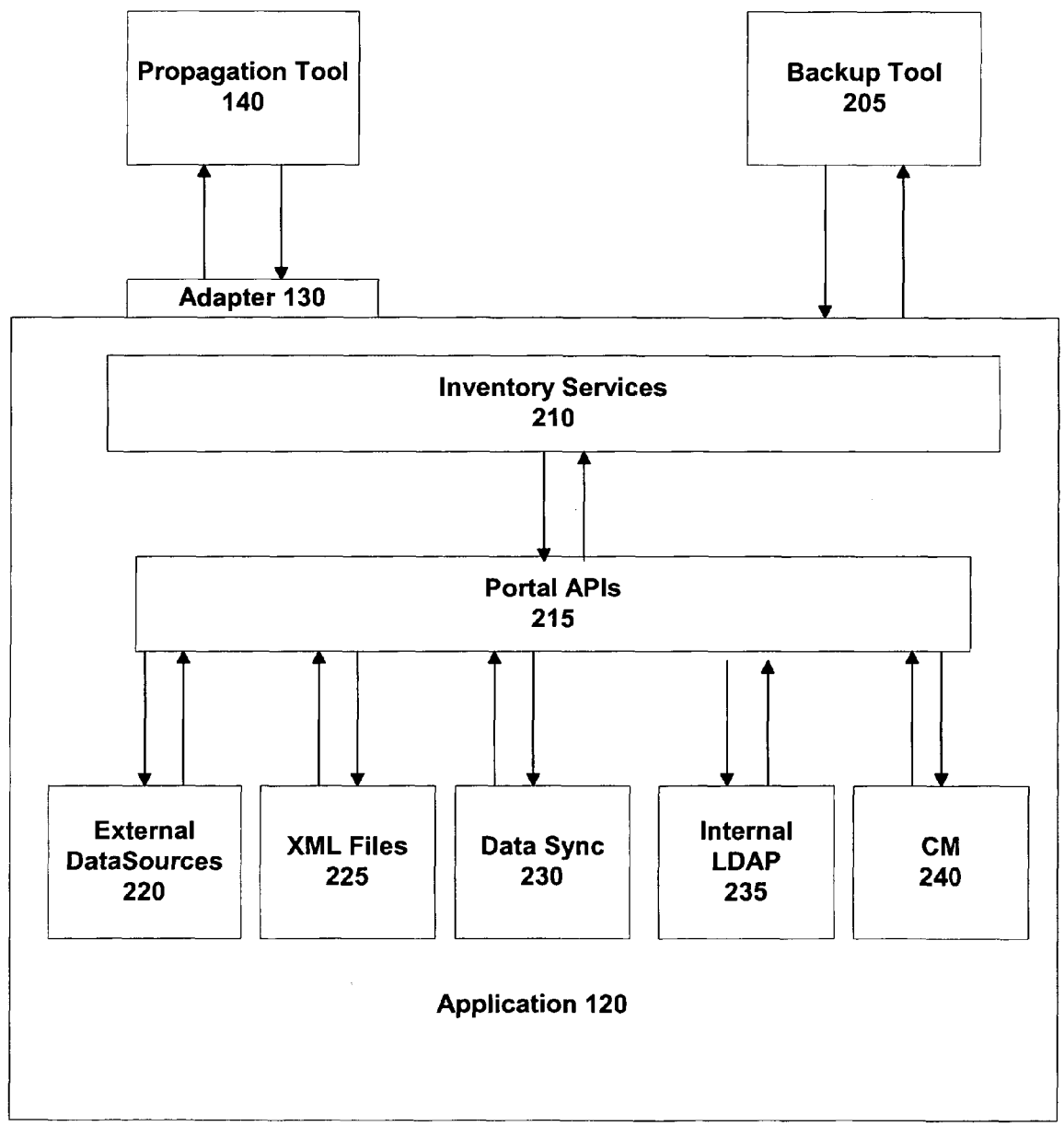
FIG. 2 illustrates another high-level overview of an application and its interaction with a backup tool and a propagation tool in an embodiment.

FIG. 2 illustrates another high-level overview of the application 120 and its interaction with the propagation tool 140 and adapter 130 in an embodiment. The application 120 includes an inventory services layer 210 and portal Application Programming Interfaces (APIs) 215. It additionally includes various inventory data sources, namely external data sources 220, eXtensible Markup Language (XML) files 225, datasync data 230, internal Lightweight Directory Access Protocol information 235, and Content Management (CM) information. The inventory data sources store inventory data, which includes configuration data, render data, user customization information, and user data such as profiles, behavior tracking, and ad views.

A backup tool 205 is configured to generate backups of portal applications. In some embodiments, when restoring from a backup, the backup tool 205 compares a current application to an existing backup and modifies those aspects of the current application that differ from those of the backup. When generating a backup, the backup tool can perform the reverse function and modify those aspects of an existing backup that differ from a current application. In an embodiment, backup tool 205 may also work with an adapter (not shown in FIG. 2).

In some embodiments, the backup 205 and propagation 140 tools operate through a client/server model, with the tools using source data on a client to modify destination data on the server. These tools can store inventory data, configuration differences and proposed configuration changes as XML files. The backup tools can be invoked from a user interface, such as a Graphical User Interface (GUI) or a script. While in the embodiments illustrated herein, the user interface is a GUI, in alternate embodiments any number of interfaces, including text interfaces, voice interfaces, touchscreens, or any other type of interface can be used.

The external data sources 220 are data sources outside the application 120 that are used to configure or otherwise support the application. While FIG. 2 illustrates the external data sources as being within the application, in some embodiments they are associated with the application, but located outside of the application. The XML files 225 are files storing data and configuration information for the application. The datasync data 230 is data that has been generated by or stored for a runtime configuration utility. The internal LDAP 235 stores security values indicating who is able to access resources associated with the application 120. In an embodiment, such security values may also be stored in a database, such as a relational database, and managed by a relational database management system (RDBMS). The CM 240 includes graphics and rendering information that is displayed in association with the portal application.

The portal APIs are used to access and manipulate the various inventory data sources 220, 225, 230, 235. In some cases, the portal APIs are utilized by the inventory services 210, but primarily they are utilized during the normal creation and utilization of the application 120.

The inventory services layer 210 is configured to receive requests from the propagation tool 140 and backup tool 205. These requests take the form of requests to retrieve inventory data stored in the various inventory data sources and requests to modify the inventory data stored in the various inventory data services. The inventory services layer abstracts all of the data access to the sources below it, so that the propagation tool 140 only needs to submit a request for certain data, and the inventory services layer locates and either provides or modifies the data.

The inventory services layer 210 performs a certain number of information retrieval services. These services include a listing service that indicates all of the subcategories within a particular category, such as all the portlets defined for a particular web application. The services further include a dependency service that indicates what elements are needed to run a particular application, such as which portlets are associated with particular pages or portals. It additionally includes an identity function that can provide previous names for particular data values. In addition to the functions above that retrieve particular pieces of data, the inventory services layer also includes update services that can delete, modify, or create inventory data. While the above services are discussed for illustrative purposes, the inventory services layer 210 can be configured to perform any number of retrieval or updating services.

Figure 3:
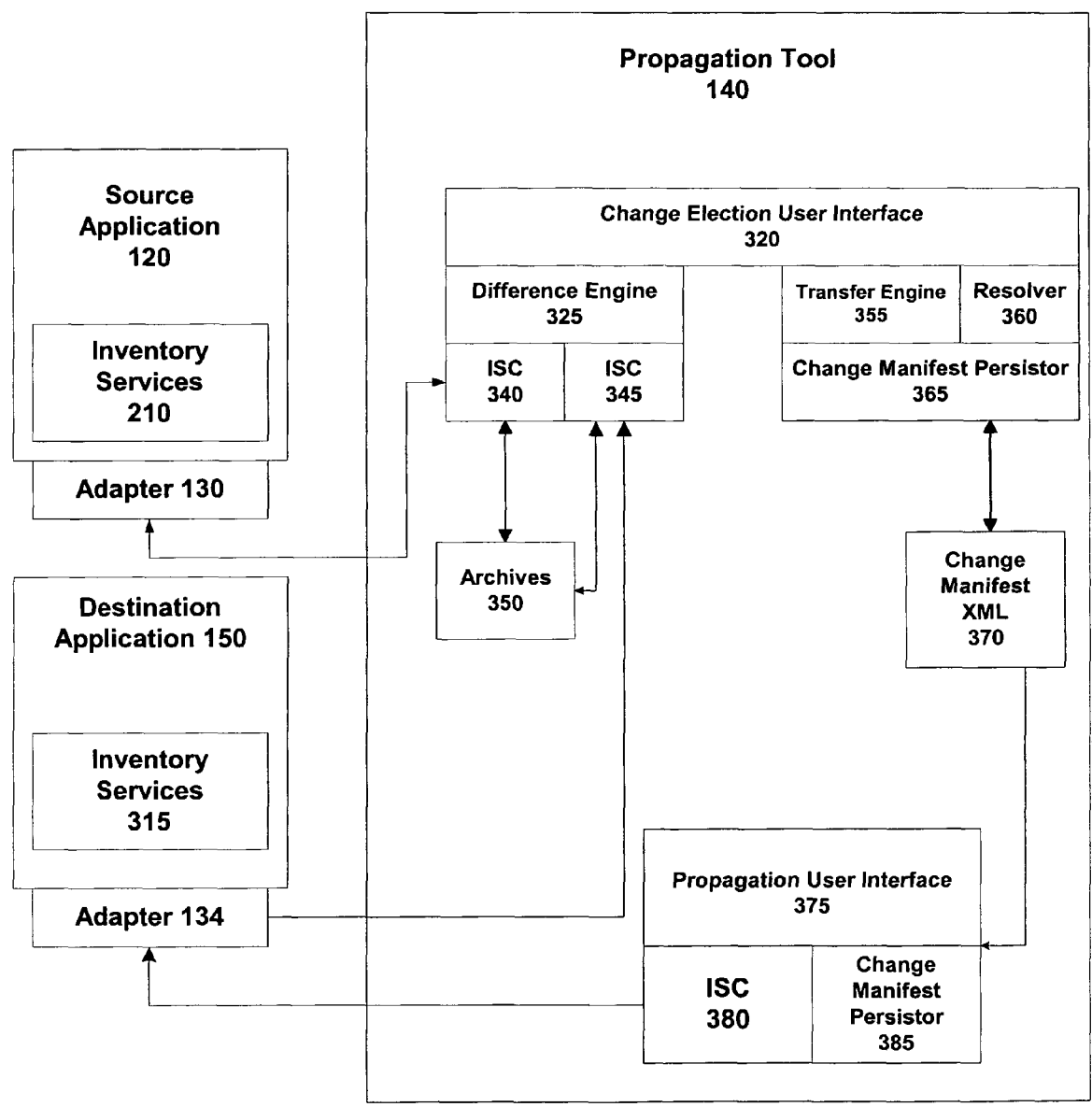
FIG. 3 illustrates a high-level overview of a system for propagating changes from a source application to a backup application in an embodiment.

FIG. 3 illustrates a high-level overview of a system for propagating changes from a source application to a backup application in an embodiment. The propagation tool 140 is configured to propagate changes between a source application 120 in the source environment 105 of FIG. 1 via adapter 130 and a destination application 150 in the destination environment of FIG. 1 via adapter 134. While in the present embodiment the two applications are located in different environments, in alternate embodiments, the two applications can be located in the same environment. In one embodiment, the source application 120 is a modified or adjusted version of the destination application 150, that having been tested in a testing environment, is having its configuration changes propagated to the destination application.

The propagation tool 140 includes a number of Inventory Services Consumers (ISCs) 340, 345, 380 that are configured to communicate with adapters 130-134, which in turn provide access to the inventory services layers 210, 315 of the source 120 and destination 150 applications. These consumers 340, 345, 380 are configured to perform the varying inventory retrieval and update services discussed with respect to FIG. 2. The adapters 130, 134 are the primary mechanism by which the propagation tool 140 interacts with the applications 120, 150.

Two ISCs 340, 345 gather inventory data from the applications through the inventory services layers 210, 315 and store the information in the inventory archives 350. While in one embodiment, this inventory data is selected from the inventory sources described in FIG. 2, in alternate embodiments; other data sources may be utilized as well. The first ISC 340 develops a "snapshot" of all of the inventory data in the source application 120 and stores the data in an XML file in the archives 350. The second ISC 345 generates a similar snapshot of all of the data stored in the destination application 150 and similarly stores the information in the archives 350.

An inventory difference engine 325 reads the XML data stored in the archives 350, compares the source and destination inventory data gathered by the ISCs 340, 345, and determines the differences between the two applications. In some embodiments, the archives 350 also store historical data about the state of the two applications 120, 150 throughout different points in time and the inventory difference engine utilizes this information to determine the differences between the two applications 120, 150.

These differences can be viewed through a change election user interface 320. The change election user interface provides a graphical listing of some or all differences between the two applications. The differences can be organized according to types of information, sources of information, or any other system of organization.

The change election user interface 320 can then be utilized to select which inventory data in the source application 120 should be propagated to the destination application 150. In one embodiment, a user can manually select through the user interface which differences will modified or which configuration values that are in the source application 120 should be propagated to the destination application 150.

In an alternate embodiment, a user can designate preselected rules which indicate which differences should be propagated from the source application to the destination application and which changes should be ignored.

A resolver 360 allows the designation of post-processing changes to be performed on various pieces of inventory data once the data is on the destination server. For example, an administrator adding a portlet to a desktop page in staging could set a rule that any visitor-customized view of the page should updated to view the new portlet. A transform engine 355 can designate changes that should be performed on inventory data as it is transferred to a new environment.

The changes that are selected are then stored in a change manifest.xml file by a first change manifest persistor 365. While in the present embodiment, the changes are stored in an XML file, in alternate embodiments; any number of file formats can be used.

The propagation tool user interface allows a user to invoke a propagation request. A second change manifest persistor 385 reads all of the changes stored in the change manifest 370 and passes them to a third ISC 380. The third ISC 380 updates the relevant inventory data in the application 150 through its inventory services 315. At this point, any requested changes have been propagated from the source application 120 to the destination application.

If an unresolved ordering is detected while applying changes during propagation of the set of changes to the second version of the application, an inquiry is made of the destination environment adapter 134 for a suggested ordering. The changes are applied to the destination environment according to the suggested ordering, when a suggested ordering is received. This processing is described in further detail below with reference to FIG. 4A. In the event that applying the changes according to the suggested ordering fails to provide a successful outcome, then another suggested ordering can be requested and tried, or an administrator may be prompted for a suggested ordering. This processing is described in further detail below with reference to FIG. 4B.

Figure 4A:
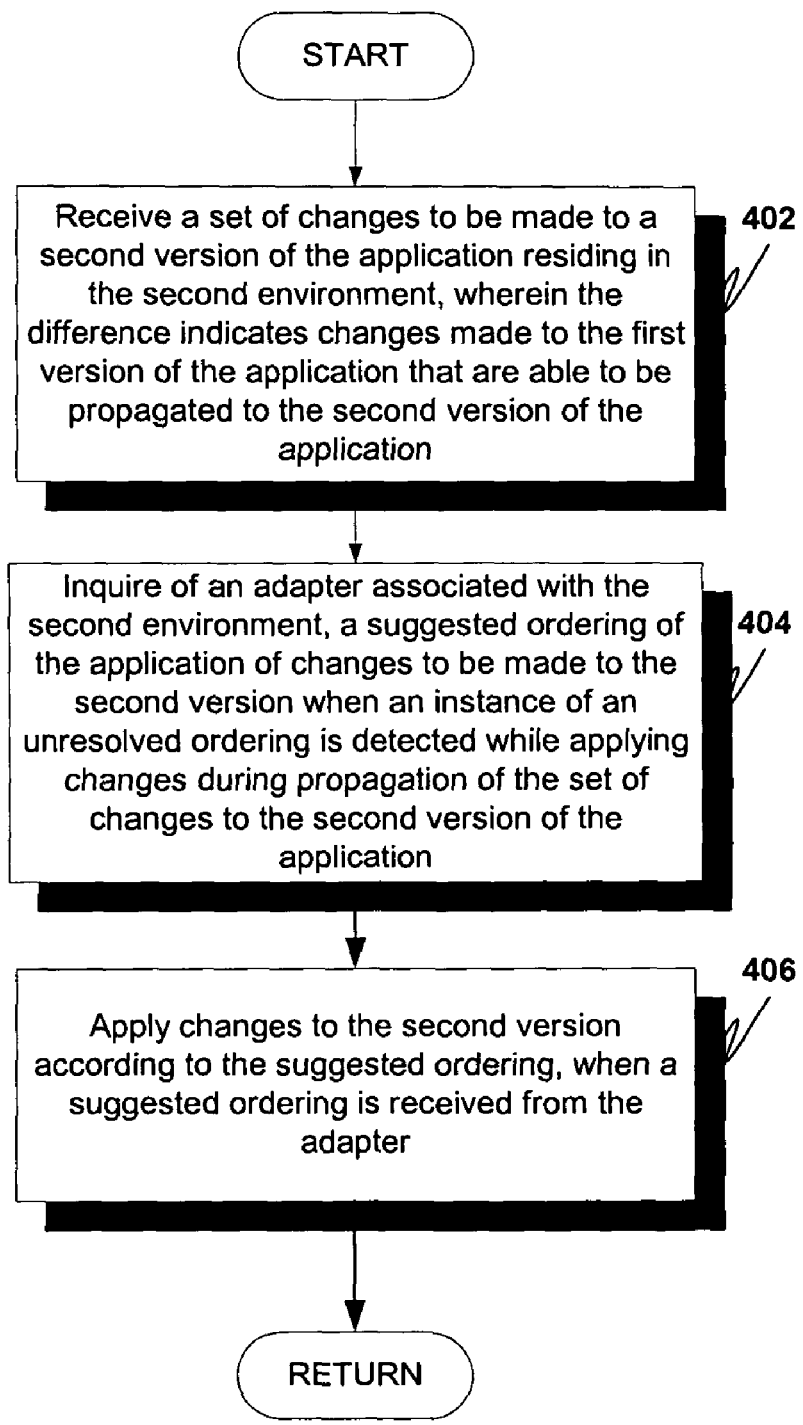
FIG. 4A illustrates a flowchart that provides a high-level overview of processing for determining an ordering for propagating changes to an application between a first environment and a second environment in an embodiment.

FIG. 4A illustrates a flowchart that provides a high-level overview of processing for determining changes to propagate to an application in an embodiment. The technique shown in FIG. 4A is operable with a propagation tool, such as propagation tool 140 of FIG. 1, for example. As shown in FIG. 4A, a set of changes to be made to a second version of the application residing in the second environment is received (block 402). The set of changes indicates changes made to the first version of the application that can be propagated to the second version of the application. An inquiry is made (block 404) for suggested ordering of the application of changes to be made to the second version when an instance of an unresolved ordering is detected while applying changes during propagation of the set of changes to the second version of the application. Changes are applied (block 406) to the second version according to the suggested ordering, when a suggested ordering is received.

Figure 4B:
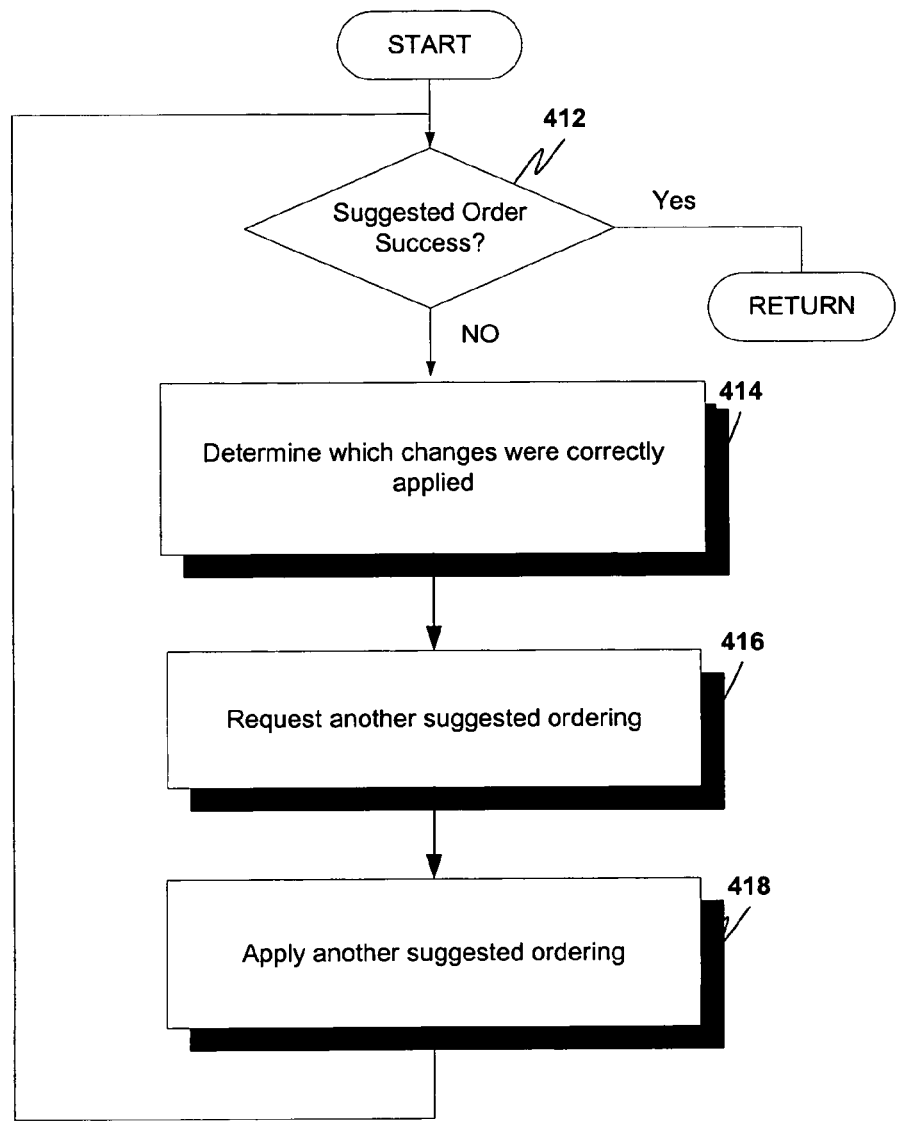
FIG. 4B illustrates a flowchart that provides a high-level overview of processing for determining an ordering for propagating changes to an application between a first environment and a second environment in an embodiment.

FIG. 4B illustrates a flowchart that provides a high-level overview of processing for determining an ordering for propagating changes in an embodiment. The technique for propagating changes shown in FIG. 4B is operable with a propagation tool, such as propagation tool 140 of FIG. 1, for example. As shown in FIG. 4B, a determination is made whether the suggested ordering for applying the changes of block 406 was successful (block 412). If the suggested ordering is successful, then the processing is completed. Otherwise, in block 414, a determination is made which changes were correctly applied. Then, in block 416, an alternative suggested ordering is requested. The alternative suggested ordering may be requested from the destination adapter 134, an administrator, or other source(s). The changes may be applied according to the alternative suggested ordering (block 418). The processing of blocks 412-418 may be repeated until a successful propagation of the changes is achieved.

Figure 5A:
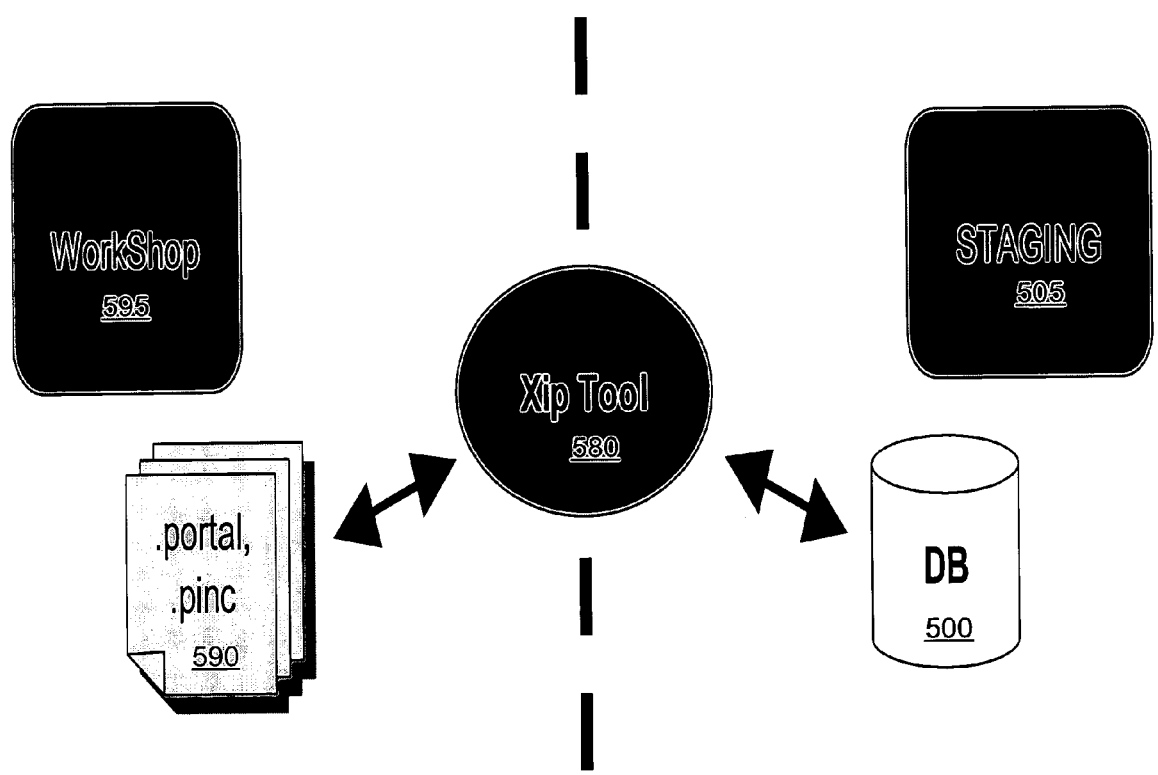
FIG. 5A illustrates a high-level overview of a mechanism for propagating changes from a workshop environment to a staging environment in an embodiment.

FIG. 5A illustrates a high-level overview of a mechanism for propagating changes from a workshop environment to a staging environment in an embodiment. As shown by FIG. 5A, a XIP tool 580 provides a mechanism for propagating changes from a workshop environment 595 to a staging environment 505. Because environment 595 employs .portal/.pinc files, which are used as templates to create desktops in the database 500, XIP tool 580 provides the capability to read and write information in these formats. Additionally, since the staging environment 505 includes databases 500, XIP tool 580 provides the capability to read and store information to the databases 500. The XIP tool 580 embodiments can serve the needs of developers who seek to use the XIP tool 500 to "round trip" changes to and from staging environment 505 and workshop environment 595. The XIP tool 580 embodiments can overcome difficulties arising from bringing changes made to desktops in the staging environment 505 back into the workshop environment 595, as well as applying changes made in the workshop environment 595 to existing desktops in the staging environment 505.

In some embodiments, the XIP tool 500 can provide one or more of the following features: Security, through logins and permissions based on identity, a Command Line Interface, a Policy-based Merge (updates, deletes, moves), an ability to Preserves User Customizations, an ability to Utilizes Portal API's in order to preserve Referential and Data Model Integrity, an ability to Consume and Produce ordinary Workshop files in order to move assets between a workshop environment to a staging environment, an ability to use public API's to provide extensibility, an ability to perform Scoped Import (Library, Admin, User) and Selective Import (desktop, book, page).

Figure 6:
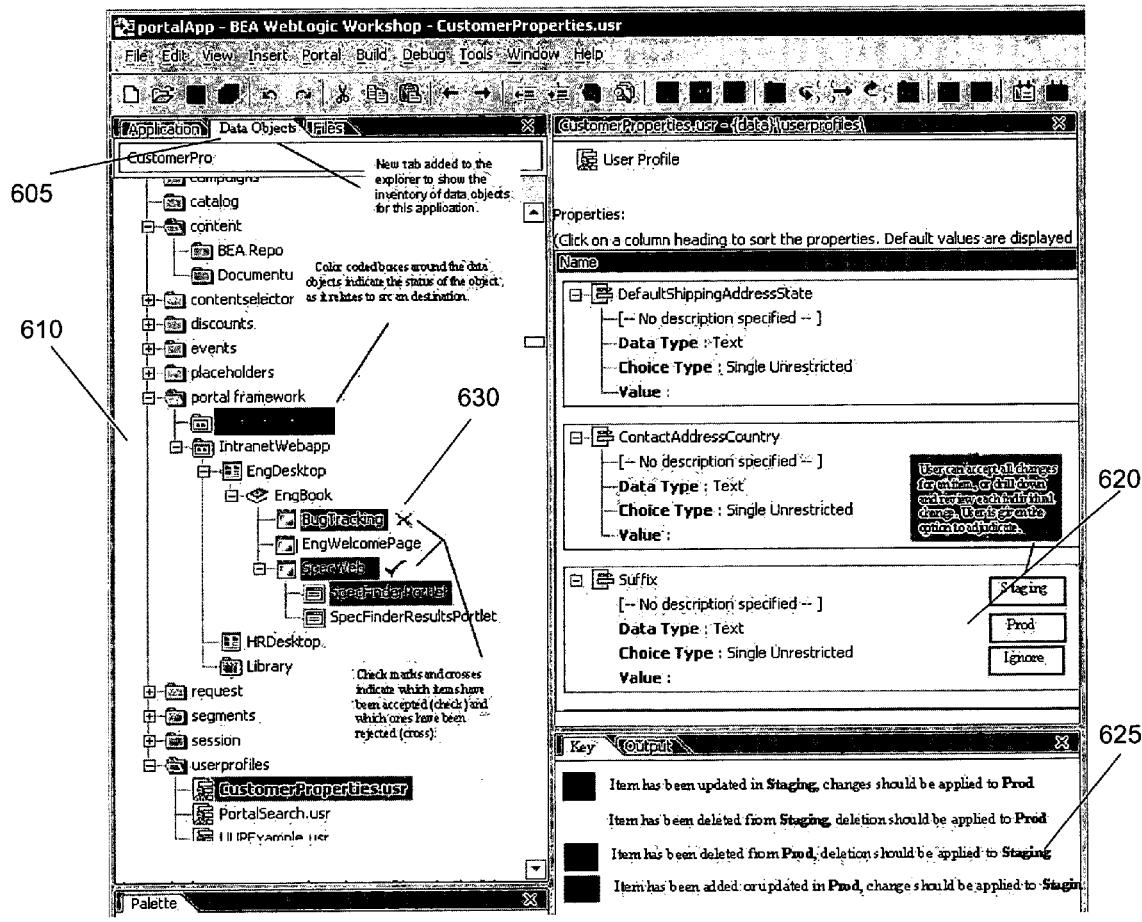
FIG. 6 illustrates a high-level overview of a user interface for performing propagation activities in an embodiment.

FIG. 6 illustrates a high-level overview of a user interface for performing propagation activities in an embodiment. An object type setting 605 enables a user to select different types of inventory data to be displayed in a main window 610. The main window 610 displays a text tree listing objects of a particular type. The interface optionally includes a series of color or shaded codes indicating how a particular item differs between the source and destination sites and whether the differences should be propagated to the source application or destination application as indicated in the legend 625 for the shading codes. The differing items also have markers 630 indicating whether the changes indicated by the color codes have been accepted or rejected by a user through an acceptance/rejection interface 620 adjoining the main window 600.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for determining an ordering for propagating changes to an application between a first environment and a second environment, the method comprising steps processed by a processor:
    determining, based on changes to a first version of the application residing in the first environment, a set of changes to apply to a second version of the application residing in the second environment, wherein determining the set of changes to be made to the second version of the application includes
        creating a first inventory of unique identifiers associated with each data item accessible to the first version of the application residing in the first environment,
        creating a second inventory of unique identifiers associated with each data item accessible to the second version of the application residing in the second environment, and
        comparing the first inventory of unique identifiers to the second inventory of unique identifiers to determine the set of changes;
    propagating the set of changes to the second version of the application, wherein pre-selected rules indicate which of the set of changes are propagated from the first version of the application to the second version of the application and which of the set of changes should be ignored;
    receiving the set of changes to be made to the second version of the application residing in the second environment;
    detecting an instance of an unresolved ordering of the set of changes to be made to the second version of the application, wherein the instance of the unresolved ordering occurs when two or more changes are received by the second version of the application;
    inquiring a suggested ordering of the application of changes to be made to the second version when an instance of an unresolved ordering is detected, wherein the suggested ordering includes a default ordering determined from traversing a configuration tree stored in a computer readable storage medium; and
    applying the set of changes to the second version of the application according to the suggested ordering, wherein if the suggested ordering for applying the set of changes is successful, the changes are accepted; otherwise, an alternative suggested ordering is obtained and the set of changes are applied according to the alternative suggested ordering.

2. The method of claim 1, wherein inquiring a suggested ordering of the application of changes to be made to the second version when an instance of an unresolved ordering comprises:
    inquiring of an adapter associated with the second environment, the suggested ordering of the application of changes to be made to the second version.

3. The method of claim 2, wherein inquiring of an adapter associated with the second environment, the suggested ordering of the application of changes to be made to the second version comprises:
    inquiring of an adapter associated with the second environment, the suggested ordering of the application of changes to be made to the second version;
    wherein the suggested ordering returned by the adapter comprises a default ordering determined from traversing a configuration tree.

4. The method of claim 1, wherein applying changes to the second version according to the suggested ordering comprises:
    receiving, from an adapter, a suggested ordering for applying the changes.

5. The method of claim 1, further comprising:
    determining whether the application changes to the second version according to the suggested ordering resolved the unresolved ordering.

6. The method of claim 5, further comprising:
    applying the changes according to a second suggested ordering received from an alternative source when it is determined that the application changes to the second version according to the suggested ordering failed to resolve the unresolved ordering.

7. The method of claim 6, wherein applying the changes according to a second suggested ordering received from an alternative source comprises:
    prompting an administrator for the second suggested ordering.

8. The method of claim 6, wherein applying the changes according to a second suggested ordering received from an alternative source comprises: receiving the second suggested ordering from the adapter.

9. The method of claim 6, wherein applying the changes according to a second suggested ordering received from an alternative source comprises:
    determining which changes were correctly applied; and repeatedly performing the determining and applying recited in claim 6 until the changes are correctly applied to the second version.

10. The method of claim 1 wherein a backup tool is configured to generate a backup of the application.

11. The method of claim 10 wherein when restoring from the backup, the backup tool compares a current application to an existing backup and modifies those aspects of the current application that differ from those of the backup.

12. The method of claim 10 wherein the backup tool modifies those aspects of an existing backup that differ from a current application.

13. The method of claim 1 wherein the suggested ordering includes a default ordering determined from traversing a configuration tree stored in a non-transitory computer readable storage medium.

14. A non-transitory machine readable storage medium carrying one or more sequences of instructions for determining an ordering for propagating changes to an application between a first environment and a second environment, which instructions, when executed by one or more processors, cause the one or more processors to carry out:
   determining, based on changes to a first version of the application residing in the first environment, a set of changes to apply to a second version of the application residing in the second environment, wherein determining the set of changes to be made to the second version of the application includes
      creating a first inventory of unique identifiers associated with each data item accessible to the first version of the application residing in the first environment,
      creating a second inventory of unique identifiers associated with each data item accessible to the second version of the application residing in the second environment, and
      comparing the first inventory of unique identifiers to the second inventory of unique identifiers to determine the set of changes;
   propagating the set of changes to the second version of the application, wherein pre-selected rules indicate which of the set of changes are propagated from the first version of the application to the second version of the application and which of the set of changes should be ignored;
   receiving the set of changes to be made to the second version of the application residing in the second environment;
   detecting an instance of an unresolved ordering of the set of changes to be made to the second version of the application, wherein the instance of the unresolved ordering occurs when two or more changes are received by the second version of the application;
   inquiring a suggested ordering of the application of changes to be made to the second version when an instance of an unresolved ordering is detected, wherein the suggested ordering includes a default ordering determined from traversing a configuration tree stored in a computer readable storage medium; and
   applying the set of changes to the second version of the application according to the suggested ordering, wherein if the suggested ordering for applying the set of changes is successful, the changes are accepted; otherwise, an alternative suggested ordering is obtained and the set of changes are applied according to the alternative suggested ordering.

15. The non-transitory machine readable storage medium of claim 14, wherein the instructions for inquiring a suggested ordering of the application of changes to be made to the second version include instructions for carrying out:
   inquiring of an adapter associated with the second environment, the suggested ordering of the application of changes to be made to the second version.

16. The non-transitory machine readable storage medium of claim 15, wherein the instructions for inquiring of an adapter associated with the second environment, the suggested ordering of the application of changes to be made to the second version include instructions for carrying out:
   inquiring of an adapter associated with the second environment, the suggested ordering of the application of changes to be made to the second version;
   wherein the suggested ordering returned by the adapter comprises a default ordering determined from traversing a configuration tree.

17. The non-transitory machine readable storage medium of claim 14, wherein the instructions for applying changes to the second version according to the suggested ordering include instructions for carrying out: receiving, from an adapter, a suggested ordering for applying the changes.

18. The non-transitory machine readable storage medium of claim 14, further comprising instructions for carrying out:
   determining whether the application changes to the second version according to the suggested ordering resolved the unresolved ordering.

19. The non-transitory machine readable storage medium of claim 18, further comprising instructions for carrying out:
   applying the changes according to a second suggested ordering received from an alternative source when it is determined that the application changes to the second version according to the suggested ordering failed to resolve the unresolved ordering.

20. The non-transitory machine readable storage medium of claim 19, wherein the instructions for applying the changes according to a second suggested ordering received from an alternative source include instructions for carrying out:
   prompting an administrator for the second suggested ordering.

21. The non-transitory machine readable storage medium of claim 19, wherein the instructions for applying the changes according to a second suggested ordering received from an alternative source include instructions for carrying out:
   determining which changes were correctly applied; and repeatedly performing the determining and applying recited in claim 6 until the changes are correctly applied to the second version.

22. An apparatus for managing applications, the apparatus comprising:
   a processor; and
   one or more stored sequences of instructions which, when executed by the processor, cause the processor to carry out the steps of:
   determining, based on changes to a first version of the application residing in the first environment, a set of changes to apply to a second version of the application residing in the second environment, wherein determining the set of changes to be made to the second version of the application includes
      creating a first inventory of unique identifiers associated with each data item accessible to the first version of the application residing in the first environment,
      creating a second inventory of unique identifiers associated with each data item accessible to the second version of the application residing in the second environment, and
      comparing the first inventory of unique identifiers to the second inventory of unique identifiers to determine the set of changes;
   propagating the set of changes to the second version of the application, wherein pre-selected rules indicate which of the set of changes are propagated from the first version of the application to the second version of the application and which of the set of changes should be ignored;
   receiving the set of changes to be made to the second version of the application residing in the second environment;

detecting an instance of an unresolved ordering of the set of changes to be made to the second version of the application, wherein the instance of the unresolved ordering occurs when two or more changes are received by the second version of the application;

inquiring a suggested ordering of the application of changes to be made to the second version when an instance of an unresolved ordering is detected, wherein the suggested ordering includes a default ordering determined from traversing a configuration tree stored in a computer readable storage medium; and applying the set of changes to the second version of the application according to the suggested ordering, wherein if the suggested ordering for applying the set of changes is successful, the changes are accepted; otherwise, an alternative suggested ordering is obtained and the set of changes are applied according to the alternative suggested ordering.

\* \* \* \* \*

UNITED STATES PATENT AND TRADEMARK OFFICE
CERTIFICATE OF CORRECTION

| | | |
|---|---|---|
| PATENT NO. | : 7,730,477 B2 | |
| APPLICATION NO. | : 11/235773 | |
| DATED | : June 1, 2010 | |
| INVENTOR(S) | : Peter Laird | |

Figure 5B:
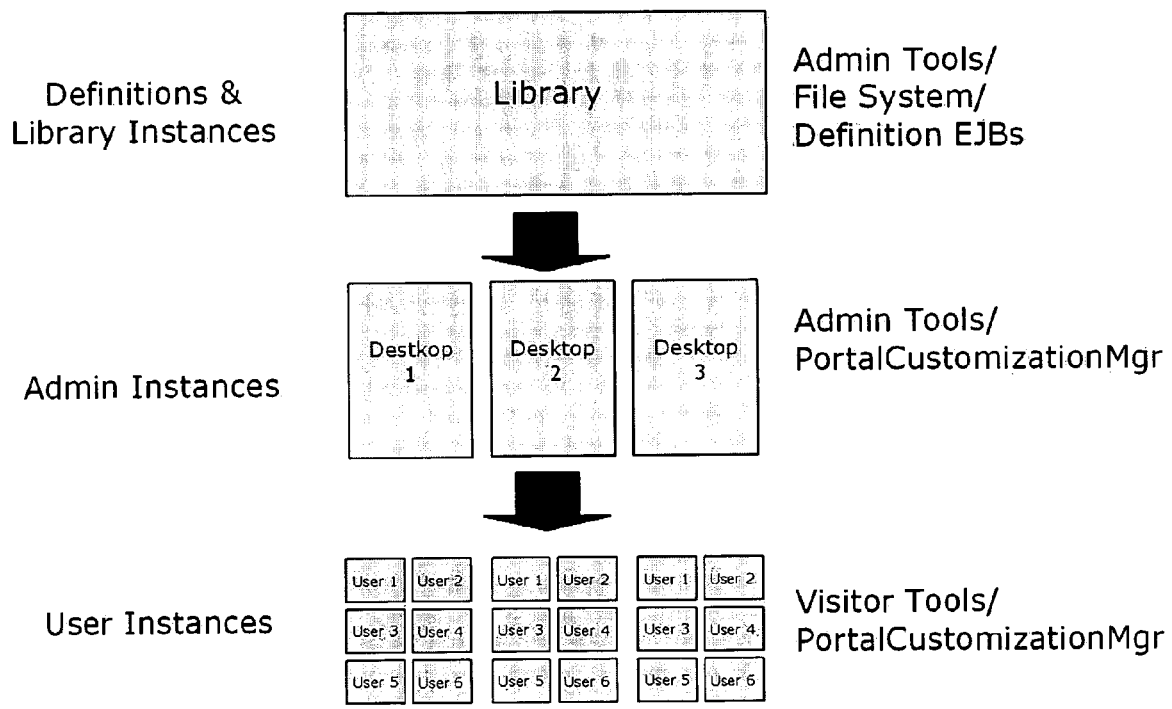
FIG. 5B illustrates a high-level overview of a scoping mechanism for propagating changes from a workshop environment to a staging environment in an embodiment.

It is certified that error appears in the above-identified patent and that said Letters Patent is hereby corrected as shown below:

IN THE DRAWINGS,
On sheet 7 of 8, in Figure 5B, Besides Box "Desktop 2", line 1, delete "Destkop" and insert
-- Desktop --, therefor.

Signed and Sealed this
Twelfth Day of July, 2011

David J. Kappos
*Director of the United States Patent and Trademark Office*